(12) United States Patent
Kojima et al.

(10) Patent No.: US 8,568,816 B2
(45) Date of Patent: Oct. 29, 2013

(54) CANDY AND PROCESS FOR PRODUCING THE SAME

(75) Inventors: Takayuki Kojima, Saitama (JP); Yoshiaki Horie, Saitama (JP); Hiroko Ogiwara, Saitama (JP); Ryohei Yamabe, Saitama (JP)

(73) Assignee: Lotte Co., Ltd., Tokyo (JP)

( * ) Notice: Subject to any disclaimer, the term of this patent is extended or adjusted under 35 U.S.C. 154(b) by 577 days.

(21) Appl. No.: 11/919,238

(22) PCT Filed: Apr. 13, 2006

(86) PCT No.: PCT/JP2006/307828
§ 371 (c)(1),
(2), (4) Date: Nov. 6, 2007

(87) PCT Pub. No.: WO2006/115069
PCT Pub. Date: Nov. 2, 2006

(65) Prior Publication Data
US 2008/0193620 A1 Aug. 14, 2008

(30) Foreign Application Priority Data
Apr. 25, 2005 (JP) .................. 2005-127214

(51) Int. Cl.
*A23G 3/36* (2006.01)
*A23G 3/54* (2006.01)

(52) U.S. Cl.
USPC .............. 426/548; 426/89; 426/249; 426/515

(58) Field of Classification Search
USPC ............................ 426/548, 660, 89, 249, 515
See application file for complete search history.

(56) References Cited

U.S. PATENT DOCUMENTS

| | | | | |
|---|---|---|---|---|
| 5,580,601 A | * | 12/1996 | Ribadeau-Dumas et al. | 426/660 |
| 6,099,880 A | | 8/2000 | Klacik et al. | |
| 2004/0192773 A1 | * | 9/2004 | Suzuki et al. | 514/543 |
| 2004/0234459 A1 | * | 11/2004 | Faust et al. | 424/48 |
| 2009/0053390 A1 | | 2/2009 | Sakou et al. | |

FOREIGN PATENT DOCUMENTS

| | | | | |
|---|---|---|---|---|
| JP | 9-47222 | A | | 2/1997 |
| JP | 09051789 | A | * | 2/1997 |
| JP | 11289987 | A | * | 10/1999 |
| JP | 2000139356 | A | * | 5/2000 |
| JP | 2000-342184 | A | | 12/2000 |
| JP | P3460187 | | | 8/2003 |
| JP | U3111014 | | | 5/2005 |
| JP | 2005333946 | A | * | 12/2005 |
| JP | 2006-280214 | | | 10/2006 |
| JP | 2006-280215 | | | 10/2006 |
| JP | 2006-280216 | | | 10/2006 |
| KR | 2002-0007725 | | | 1/2002 |

OTHER PUBLICATIONS

Machine translation of Kitaoka JP 2000-342184, printed on Jul. 2010.*
Machine translation Okura JP 09 047222; published 1987.*
JP Notice of Reason for Rejection of Nov. 24, 2010 and its English translation issued in corresponding Japanese Patent Application No. 2005-127214.
Korean Official Action, 9-5-2007-021968515, Apr. 24, 2007.
Lotte Newsletter—New Texture of Grapefruit and Xylitoll—Oct. 12, 2004 (English Translation).
No, Bong-Soo et al.—Characteristics and application of the sugar alcohol—Aug. 15, 2000 (Machine Translation) pp. 4-8.

* cited by examiner

*Primary Examiner* — Chhaya Sayala
*Assistant Examiner* — Walter Moore
(74) *Attorney, Agent, or Firm* — Young & Thompson

(57) ABSTRACT

It is intended to provide a candy in which a crystalline candy containing xylitol and a noncrystalline sugar-free candy are combined and, particularly, the crystalline candy and the noncrystalline sugar-free candy are combined side-by-side and the junction part has a continuous, smooth and novel appearance and texture; and a technique for efficiently producing the same. A flowable crystalline candy dough, containing as carbohydrate, 66 to 99% by weight of xylitol and 34 to 1% by weight of another sugar alcohol and a flowable noncrystalline sugar-free candy dough are simultaneously deposited.

4 Claims, No Drawings

CANDY AND PROCESS FOR PRODUCING THE SAME

TECHNICAL FIELD OF THE INVENTION

This invention relates to a candy and a process for producing the same, wherein a crystalline candy and a noncrystalline candy are simultaneously deposited, the crystalline candy and the noncrystalline sugar-free candy thereby being combined, and wherein the junction part therebetween is continuous and smooth.

BACKGROUND ART

Kintaro-ame candy or other laminated candy is well-known as a type of candy which is a combination of different types of dough.

Kintaro-ame candy is a stick candy which is made to show the face of Kintaro at any cross-section thereof. Industrially considering, the known process to form the candy is to have a plurality of small bore nozzle bodies equipped within a large bore nozzle body; and to cause core materials that are extruded from individual small bore nozzle bodies to be combined with one another within an outer skin material that is extruded from a large bore nozzle of an outer skin material extruder that is in communication with the large bore nozzle body (see, for example, Patent Document 1). And lately, another process known is to produce a laminated candy that is visually beautiful owing to the smooth contact surface among layers in the candy, wherein the candy is shaped by repeating a series of injection and thrusting operations: to inject a candy dough into a molding tool, to thrust a die that fits into said molding tool, and then to inject another candy dough (see, for example, Patent Document 2).

Recently, a candy is produced which is mainly made of xylitol and which comprises a crystalline candy and a noncrystalline sugar-free candy overlapping with one another. The crystalline candy, which is a part of the candy comprising a crystalline candy and a noncrystalline sugar-free candy overlapping with one another, is produced through a process of melting compounds such as xylitol and sorbitol and through a heat retention process in which the obtained solution is held at the temperature not exceeding the melting point of xylitol and at which temperature the flowability of the solution is maintained and a part or most of the xylitol is left in a crystallized fluid form; the crystallite candy held in said heat retention process is poured onto the noncrystalline sugar-free candy which has been poured into the mold, and then the candy is cooled to solidify; and finally, the noncrystalline sugar-free candy is poured further onto the candy (see, for example, Patent Document 3).

The candy which comprises a crystalline candy and a noncrystalline sugar-free candy overlapping with one another is attracting attention as a candy having a gorgeous appearance created by the contrast between the two different colors of the crystalline candy, which is white, and the noncrystalline sugar-free candy, and having two different texture. However, given that it is difficult to control the crystallization of the crystalline candy, and that the deposit temperature of the noncrystalline sugar-free candy is higher than that of the crystalline candy, a large-scale production has been difficult because the crystalline candy is likely to melt when the crystalline candy and the noncrystalline sugar-free candy are deposited simultaneously.

Accordingly, said candy is not the one having novel appearance or texture because it is produced in the following way: 1) either one of the candies is deposited and, after being cooled, the other one of the candies is deposited on the one which has been deposited, causing the junction part between the two candies to be inharmonious and discontinuous in appearance; alternatively, 2) a crystalline candy is poured into a ring-shaped molding tool having a removable pin, and after being cooled, a crystalline candy is poured into a center portion formed by removing the pin, causing the junction part between the two candies to be inharmonious, and preventing the two candies from being combined side-by-side (see, for example, Patent Document 4).

Patent Document 1: Japanese Published Unexamined Patent Application No. H9-51789
Patent Document 2: Japanese Published Unexamined Patent Application No. 2003-210114
Patent Document 3: Japanese Published Examined Patent Application No. 3460187
Patent Document 4: Japanese Published Unexamined Patent Application No. 2005-46106

DISCLOSURE OF INVENTION

Problems to be Solved by the Invention

The present invention is intended to provide a candy wherein a crystalline candy containing xylitol and a noncrystalline sugar-free candy are combined and, particularly, the crystalline candy and the noncrystalline sugar-free candy are combined side-by-side and the junction part has a continuous, smooth and novel appearance and texture; and a technique to efficiently produce the same.

Means for Solving the Problem

The inventors of the present invention have been committed to research for solving said problems, and found that they could be settled by means of simultaneously depositing a flowable crystalline candy dough containing, as carbohydrate, 66 to 99% by weight of xylitol and 34 to 1% by weight of another sugar alcohol with a flowable noncrystalline sugar-free candy dough; and the present invention is completed.

Also, a candy is produced in which the crystalline candy and the noncrystalline sugar-free candy are combined side-by-side, and the junction part of which is continuous and smooth, by means of the following processes: a compound containing, as carbohydrate, 66 to 99% by weight of xylitol and 34 to 1% by weight of another sugar alcohol is heated to melt; the solution thereby obtained is held at the temperature not exceeding the melting point of sugar alcohol and at which temperature the flowability of the solution is maintained; and a flowable crystalline candy dough with a part or most of the xylitol and the another sugar alcohol being crystallized and a flowable noncrystalline sugar-free candy dough are simultaneously deposited and then are cooled.

Furthermore, it is preferred to prepare the flowable crystalline candy dough being maintained between 60 and 95° C. while the flowable noncrystalline sugar-free candy dough being maintained between 110 and 150° C., and then to simultaneously deposit said crystalline candy dough and said noncrystalline sugar-free candy dough and to cool.

Besides, if said another sugar alcohol consists of one or more of sugar alcohols selected from erythritol, sorbitol, maltitol and hydrogenated maltose syrup, it is possible to preferably produce a candy the junction part of which is continuous and smooth.

Lastly, the present invention produces a candy in which a crystalline candy and a noncrystalline sugar-free candy, both being produced by means of said producing processes, are combined side-by-side, and the junction part is continuous and smooth.

Advantageous Effect of the Invention

The present invention enables the junction part between a crystalline candy and a noncrystalline sugar-free candy to be continuous and smooth, and also enables a candy having novel appearance and texture to be produced quite efficiently by means of simultaneous deposition. And particularly, the present invention makes it possible to provide a candy in which the crystalline candy and the noncrystalline sugar-free candy are combined side-by-side, and the junction part is continuous and smooth.

BEST MODE FOR CARRYING OUT THE INVENTION

The modes of the present invention are described below in detail with reference to the specific examples.

The crystalline candy used in the present invention contains, as carbohydrate, 66 to 99% by weight of xylitol and 34 to 1% by weight of sugar alcohol other than xylitol, preferably 80 to 99% by weight of xylitol and 20 to 1% by weight of sugar alcohol other than xylitol.

Xylitol is a type of sugar alcohol obtained by means of reduction of D-Xylose, and is now known to provide a remarkable cooling sensation and to have no cariogenic properties. However, given that xylitol has a high degree of crystalline properties, and when it is used as a basic ingredient in the conventional producing process of a candy, it is deformed into a large crystal aggregate, which is easy to come apart even with a small impact; and the difficulty in controlling the crystallization of xylitol has made mass production arduous.

Then, a compound of xylitol and sugar alcohol other than xylitol is mixed at said ratio and is used in the present invention to facilitate control of the crystallization of xylitol; and when most portion of the crystalline candy thereby obtained is brought into a fine crystal condition, the crystalline candy becomes one that has a smooth touch and a moderate hardness, and a cooling sensation as well, without forming a large crystal aggregate which is easy to come apart even with a small impact.

Use of one or more of the sugar alcohols selected from erythritol, sorbitol, maltitol and hydrogenated maltose syrup, excluding xylitol, preferably enables mass production of the candy in factories.

The noncrystalline sugar-free candy to be combined and used with said crystalline candy can properly contain carbohydrate that has been conventionally and commonly used as carbohydrate such as, for example, hydrogenated palatinose, hydrogenated maltose syrup, maltitol, sorbitol and the like.

Auxiliary ingredients, other than carbohydrate, of the crystalline candy and the noncrystalline sugar-free candy can properly contain those materials which are used for conventional candies, such as, for example, fragrant materials, acidic ingredients, artificial colorants, juice, dairy products, various medicinal properties, and the like.

Next, specific producing process of the candy according to the present invention is described.

In order to produce a flowable crystalline candy dough according to the present invention with a part or most of xylitol and another sugar alcohol thereof being crystallized, the xylitol and the another sugar alcohol, as carbohydrate, are mixed and heated to melt at said mixture ratio. The carbohydrate can be produced in any process so long as each ingredient is uniformly mixed and is in a melting condition: the carbohydrate in powder form is heated to melt, and then other auxiliary ingredients are added and mixed; alternatively, a moderate amount of water is added to the carbohydrate in powder form and is heated to melt, water is evaporated by means of further heating and vacuum concentration, and then other auxiliary ingredients are added and mixed.

Subsequently, the solution obtained through heating and melting is held at the temperature not exceeding the melting point of the sugar alcohol and at which temperature the flowability of the solution is maintained; and the flowable crystalline candy dough is produced with a part or most of xylitol and the another sugar alcohol being crystallized. A process of precipitating crystals is to add and mix a fine seed crystal, or is to generate a new crystal by stirring. With respect to the temperature of the crystalline candy dough during deposition in the present invention, it is preferred to arrange which sugar alcohol to be mixed with xylitol and the mixture ratio therebetween so that the dough is held in a fine crystal condition as carbohydrate and is held flowable, the temperature of the crystalline candy dough being maintained preferably between 60 and 95° C., even more preferably between 70 to 90° C.

In order to produce a flowable noncrystalline sugar-free candy dough to be combined and used with said crystalline candy dough, one or more types of said sugar-free sweeteners is combined and used as carbohydrate. The carbohydrate can be produced in any process so long as each ingredient is uniformly mixed and is in a melting condition: the carbohydrate in powder form is heated to melt, and then other auxiliary ingredients are added and mixed; alternatively, a moderate amount of water is added to the carbohydrate in powder form and is heated to melt, water is evaporated by means of further heating and vacuum concentration, and then other auxiliary ingredients are added and mixed. The flowable noncrystalline sugar-free candy dough is prepared to be preferably between 110 and 150° C., even more preferably between 115 to 130° C. Within the range of 115 to 130° C., in particular, the noncrystalline sugar-free candy dough becomes optimally viscous for deposition, thus allowing for efficient mass production.

In the present invention, the flowable crystalline candy dough and the flowable noncrystalline sugar-free candy dough thus prepared are simultaneously deposited. Simultaneous deposition provides a smooth junction part between the crystalline candy and the noncrystalline sugar-free candy. The problem that has hindered the simultaneous deposition of the crystalline candy and the noncrystalline sugar-free candy is that, given that deposition of a candy dough requires flowability of the candy dough, a crystalline candy dough and a noncrystalline sugar-free candy dough are different in the temperature range within which flowability is provided, the temperature range of the noncrystalline sugar-free candy dough being higher. Hence, when both types of dough are simultaneously deposited at different temperatures at which the respective dough retains flowability, crystals in the crystalline candy that hold a fine crystal condition will melt; besides, as they are cooled, coarse crystals will be created in a short time, causing the junction part of a candy to be discontinuous and causing the candy to have less texture and cooling sensation. Even if, trying to prevent this, the crystalline candy dough and the noncrystalline sugar-free candy dough are held in the same temperature, the noncrystalline sugar-free candy dough will be difficult to deposit owing to its increased viscosity.

Therefore, in the present invention, the crystalline candy dough is prepared to be preferably between 60 and 95° C., even more preferably between 70 to 90° C., while the noncrystalline sugar-free candy dough is prepared to be preferably between 110 and 150° C., even more preferably between 115 to 130° C., as mentioned above; and both types of dough are simultaneously deposited.

When the temperature of the crystalline candy dough is below 60° C., excessive crystallization will develop, and the crystalline candy dough will be difficult to deposit owing to its increased viscosity. When the temperature of the crystalline candy dough is above 95° C., fine crystals will melt due to the excessive heat. When the temperature of the noncrystalline sugar-free candy dough is below 110° C., the candy dough will be difficult to deposit owing to its increased viscosity. When the temperature of the noncrystalline sugar-free candy dough is above 150° C., the candy dough will be of extremely small viscosity, and the fine crystals of the crystalline candy dough that is simultaneously deposited will melt; besides, and as they are cooled, coarse crystals are created in a short time, causing the candy to have coarse texture, and causing the junction part between the crystalline candy and the noncrystalline sugar-free candy to be discontinuous, which is undesirable.

Processes that have been heretofore utilized are properly applicable for the deposition process. For example, a hopper for the crystalline candy and a hopper for the noncrystalline sugar-free candy are divided into two partitions, respectively, and the dough in the partitions is simultaneously poured into one molding tool from each nozzle of the hoppers.

This process enables efficient production of a candy whose junction part, which characterizes the present invention, has a continuous, smooth and novel appearance and texture, particularly, the crystalline candy containing xylitol and the noncrystalline sugar-free candy, in which the crystalline candy and the noncrystalline sugar-free candy are combined side-by-side.

The present invention is described below in greater detail with reference to the experimental examples, but they do not limit the scope of the present invention.

EXPERIMENTAL EXAMPLE

Test Method

FIG. 1 below shows the conditions of the 2 types of candy dough and deposition progress thereof, wherein 98% by weight of xylitol as carbohydrate and 2% by weight of erythritol as another sugar alcohol was mixed and heated to melt; the solution was stirred and cooled to precipitate xylitol crystal, the solution being kept hot at 55, 60, 70, 80, 90, 95 and 100° C. to prepare 7 types of crystalline candy dough; hydrogenated palatinose and hydrogenated maltose syrup were mixed as carbohydrate to form a noncrystalline sugar-free candy, which was kept hot at 100, 110, 115, 130, 140, 150 and 160° C. to prepare 7 types of noncrystalline sugar-free candy, each of which being combined with said 7 types of crystalline candy dough and being simultaneously deposited with the latter.

TABLE 1A

| | | Condition of Candy Dough | Temperature of Noncrystalline Sugar-free Candy Dough (NSCD) | | | | | | | |
|---|---|---|---|---|---|---|---|---|---|---|
| | | | 100° C. and below | | 110° C. | | 115° C. | | 130° C. | |
| Temperature of Crystalline Candy Dough (CCD) | 55° C. and below | Condition of CCD | Bad | Too Viscous; Unable to Deposit | Bad | Too Viscous; Unable to Deposit | Bad | Too Viscous; Unable to Deposit | Bad | Too Viscous; Unable to Deposit |
| | | Condition of NSCD | | Too Viscous; Unable to Deposit | | So Viscous; Hard to Deposit | | Viscosity Favorable | | Viscosity Favorable |
| | 60° C. | Condition of CCD | Bad | So Viscous; Hard to Deposit | Permissible | So Viscous; Hard to Deposit | Permissible | So Viscous; Hard to Deposit | Permissible | So Viscous; Hard to Deposit |
| | | Condition of NSCD | | Too Viscous; Unable to Deposit | | So Viscous; Hard to Deposit | | Viscosity Favorable | | Viscosity Favorable |
| | 70° C. | Condition of CCD | Bad | Viscosity and Crystal Condition Favorable | Permissible | Viscosity and Crystal Condition Favorable | Good | Viscosity and Crystal Condition Favorable | Good | Viscosity and Crystal Condition Favorable |
| | | Condition of NSCD | | Too Viscous; Unable to Deposit | | So Viscous; Hard to Deposit | | Viscosity Favorable | | Viscosity Favorable |
| | 80° C. | Condition of CCD | Bad | Viscosity and Crystal Condition Favorable | Permissible | Viscosity and Crystal Condition Favorable | Excellent | Viscosity and Crystal Condition Favorable | Excellent | Viscosity and Crystal Condition Favorable |
| | | Condition of NSCD | | Too Viscous; Unable to Deposit | | So Viscous; Hard to Deposit | | Viscosity Favorable | | Viscosity Favorable |
| | 90° C. | Condition of CCD | Bad | Viscosity and Crystal Condition Favorable | Permissible | Viscosity and Crystal Condition Favorable | Good | Viscosity and Crystal Condition Favorable | Good | Viscosity and Crystal Condition Favorable |
| | | Condition of NSCD | | Too Viscous; Unable to Deposit | | So Viscous; Hard to Deposit | | Viscosity Favorable | | Viscosity Favorable |
| | 95° C. | Condition of CCD | Bad | Start to Melt | Permissible | Start to Melt | Permissible | Start to Melt | Permissible | Start to Melt |
| | | Condition of NSCD | | Too Viscous; Unable to Deposit | | So Viscous; Hard to Deposit | | Viscosity Favorable | | Viscosity Favorable |

TABLE 1A-continued

| | Condition of Candy | | Temperature of Noncrystalline Sugar-free Candy Dough (NSCD) | | | | | | |
|---|---|---|---|---|---|---|---|---|---|
| | Dough | | 100° C. and below | | 110° C. | | 115° C. | | 130° C. |
| 100° C. and above | Condition of CCD | Bad | Melting | Bad | Melting | Bad | Melting | Bad | Melting |
| | Condition of NSCD | | Too Viscous; Unable to Deposit | | So Viscous; Hard to Deposit | | Viscosity Favorable | | Viscosity Favorable |

TABLE 1B

| | | Condition of Candy Dough | | Temperature of Noncrystalline Sugar-free Candy Dough (NSCD) | | | | |
|---|---|---|---|---|---|---|---|---|
| | | | | 140° C. | | 150° C. | | 160° C. |
| Temperature of Crystalline Candy Dough (CCD) | 55° C. and below | Condition of CCD | Bad | Too Viscous; Unable to Deposit | Bad | Too Viscous; Unable to Deposit | Bad | Too Viscous; Unable to Deposit |
| | | Condition of NSCD | | Viscosity Somewhat Low | | Viscosity Low | | Viscosity Very Low |
| | 60° C. | Condition of CCD | Permissible | So Viscous; Hard to Deposit | Permissible | So Viscous; Hard to Deposit | Bad | So Viscous; Hard to Deposit |
| | | Condition of NSCD | | Viscosity Somewhat Low | | Viscosity Low | | Melting |
| | 70° C. | Condition of CCD | Permissible | Start to Melt | Permissible | Start to Melt | Bad | Too Viscous; Unable to Deposit |
| | | Condition of NSCD | | Viscosity Somewhat Low | | Viscosity Low | | Viscosity Very Low |
| | 80° C. | Condition of CCD | Permissible | Start to Melt | Permissible | Start to Melt | Bad | Melting |
| | | Condition of NSCD | | Viscosity Somewhat Low | | Viscosity Low | | Viscosity Very Low |
| | 90° C. | Condition of CCD | Permissible | Start to Melt | Permissible | Start to Melt | Bad | Melting |
| | | Condition of NSCD | | Viscosity Somewhat Low | | Viscosity Low | | Viscosity Very Low |
| | 95° C. | Condition of CCD | Permissible | Start to Melt | Permissible | Start to Melt | Bad | Melting |
| | | Condition of NSCD | | Viscosity Somewhat Low | | Viscosity Low | | Viscosity Very Low |
| | 100° C. and above | Condition of CCD | Bad | Melting | Bad | Melting | Bad | Melting |
| | | Condition of NSCD | | Viscosity Somewhat Low | | Viscosity Low | | Viscosity Very Low |

Next, the present invention is described below in greater detail with reference to the examples and comparative examples, but they do not limit the scope of the present invention.

Examples

Example 1

99% by weight of xylitol as carbohydrate and 1% by weight of erythritol as another sugar alcohol were mixed and heated up to 140° C. to melt. The carbohydrate solution was stirred and cooled to precipitate xylitol crystal, the solution being kept hot at 89° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side, and the junction part being continuous and smooth. Particularly, the candy could be efficiently produced when the temperature of the noncrystalline sugar-free candy was 115 and 130° C.

Example 2

80% by weight of xylitol as carbohydrate and 20% by weight of erythritol as another sugar alcohol were mixed and heated up to 140° C. to melt. The carbohydrate solution was stirred and cooled to precipitate xylitol crystal, the solution being kept hot at 76° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side and the junction part being continuous and smooth. Particularly, the candy could be efficiently produced when the temperature of the noncrystalline sugar-free candy was 115 and 130° C.

Example 3

80% by weight of xylitol as carbohydrate and 20% by weight of sorbitol as another sugar alcohol were mixed and heated up to 140° C. to melt. The carbohydrate solution was stirred and cooled to precipitate xylitol crystal, the solution being kept hot at 66° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side, the junction part being continuous and smooth.

Example 4

99% by weight of xylitol as carbohydrate and 1% by weight of maltitol as another sugar alcohol were mixed and heated up to 140° C. to melt. The carbohydrate solution was stirred and cooled to precipitate xylitol crystal, the solution being kept hot at 90° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side, the junction part being continuous and smooth. Particularly, the candy could be efficiently produced when the temperature of the noncrystalline sugar-free candy was 115 and 130° C.

Example 5

66% by weight of xylitol as carbohydrate and 34% by weight of hydrogenated maltose syrup as another sugar alcohol were mixed and heated up to 140° C. to melt. The carbohydrate solution was stirred and cooled to precipitate xylitol crystal, the solution being kept hot at 60° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side, the junction part being continuous and smooth.

Example 6

99% by weight of xylitol as carbohydrate and 1% by weight of erythritol as another sugar alcohol were mixed and heated up to 140° C. to melt. The carbohydrate solution was stirred and cooled to precipitate xylitol crystal, the solution being kept hot at 89° C. to prepare crystalline candy dough. And then, 85% by weight of hydrogenated maltose syrup and 15% by weight of hydrogenated palatinose were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side and the junction part being continuous and smooth. Particularly, the candy could be efficiently produced when the temperature of the noncrystalline sugar-free candy was 115 and 130° C.

Example 7

80% by weight of xylitol as carbohydrate and 20% by weight of erythritol as another sugar alcohol were mixed and heated up to 140° C. to melt. The carbohydrate solution was stirred and cooled to precipitate xylitol crystal; crystalline candy dough was thus prepared. And then, 85% by weight of hydrogenated maltose syrup and 15% by weight of hydrogenated palatinose were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the noncrystalline sugar-free candy were respectively combined side-by-side and the junction part being continuous and smooth. Particularly, the candy could be efficiently produced when the temperature of the noncrystalline sugar-free candy was 115 and 130° C.

Example 8

80% by weight of xylitol as carbohydrate and 20% by weight of sorbitol as another sugar alcohol were mixed and heated up to 140° C. to melt. The carbohydrate solution was stirred and cooled to precipitate xylitol crystal, the solution being kept hot at 66° C. to prepare crystalline candy dough. And then, 85% by weight of hydrogenated maltose syrup and 15% by weight of hydrogenated palatinose were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side and the junction part being continuous and smooth.

Example 9

99% by weight of xylitol as carbohydrate and 1% by weight of maltitol as another sugar alcohol were mixed and heated up to 140° C. to melt. The carbohydrate solution was stirred and cooled to precipitate xylitol crystal, the solution being kept hot at 90° C. to prepare crystalline candy dough. And then, 85% by weight of hydrogenated maltose syrup and 15% by weight of hydrogenated palatinose were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough. As a result, a candy could be produced in which the crystalline candy and the 5 types of noncrystalline sugar-free candy were respectively combined side-by-side and the junction part being continuous and smooth. Particularly, the candy could be efficiently produced when the temperature of the noncrystalline sugar-free candy was 115 and 130° C.

Example 10

66% by weight of xylitol as carbohydrate and 34% by weight of hydrogenated maltose syrup as another sugar alcohol were mixed and heated up to 140° C. to melt. The carbohydrate solution was stirred and cooled to precipitate xylitol crystal, the solution being kept hot at 60° C. to prepare crystalline candy dough. And then, 85% by weight of hydrogenated maltose syrup and 15% by weight of hydrogenated palatinose were mixed as carbohydrate to form a noncrystalline sugar-free candy, which was kept hot at 110, 115, 130, 140 and 150° C. to prepare 5 types of noncrystalline sugar-free candy, each of which being simultaneously deposited with the crystalline candy dough, respectively. As a result, a candy could be produced in which the crystalline candy and the 5 types of noncrystalline sugar-free candy were respectively combined side-by-side and the junction part being continuous and smooth.

Comparative Example 1

99% by weight of xylitol as carbohydrate and 1% by weight of erythritol as another sugar alcohol were mixed and heated up to 140° C. to melt. The carbohydrate solution was cooled while being stirred to precipitate xylitol crystal, the solution being kept hot at 89° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 160° C. to prepare a type of noncrystalline sugar-free candy. As the noncrystalline sugar-free candy was simultaneously deposited with the crystalline candy dough, the crystalline candy melted, failing to produce a candy the junction part of which was continuous and smooth.

Comparative Example 2

80% by weight of xylitol as carbohydrate and 20% by weight of sorbitol as another sugar alcohol were mixed and heated up to 140° C. to melt. The carbohydrate solution was stirred and cooled to precipitate xylitol crystal, the solution being kept hot at 66° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 160° C. to prepare a type of noncrystalline sugar-free candy. As the noncrystalline sugar-free candy was simultaneously deposited with the crystalline candy dough, the noncrystalline sugar-free candy became too viscous to be simultaneously poured into a molding tool.

Comparative Example 3

80% by weight of xylitol as carbohydrate and 20% by weight of maltitol as another sugar alcohol were mixed and heated up to 140° C. to melt. The carbohydrate solution was stirred and cooled to precipitate xylitol crystal, the solution being kept hot at 60° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 160° C. to prepare a type of noncrystalline sugar-free candy. As the noncrystalline sugar-free candy was simultaneously deposited with the crystalline candy dough, the crystalline candy melted, failing to produce a candy the junction part of which was continuous and smooth.

Comparative Example 4

66% by weight of xylitol as carbohydrate and 34% by weight of hydrogenated maltose syrup as another sugar alcohol were mixed and heated up to 140° C. to melt. The carbohydrate solution was stirred and cooled to precipitate xylitol crystal, the solution being kept hot at 60° C. to prepare crystalline candy dough. And then, 85% by weight of hydrogenated palatinose and 15% by weight of hydrogenated maltose syrup were mixed as carbohydrate to form a noncrystalline sugar-free candy, which was kept hot at 160° C. to prepare a type of noncrystalline sugar-free candy. As the noncrystalline sugar-free candy was simultaneously deposited with the crystalline candy dough, the noncrystalline sugar-free candy became too viscous to be simultaneously poured into a molding tool.

Comparative Example 5

99% by weight of xylitol as carbohydrate and 1% by weight of erythritol as another sugar alcohol were mixed and heated up to 140° C. to melt. The carbohydrate solution was stirred and cooled to precipitate xylitol crystal, the solution being kept hot at 89° C. to prepare crystalline candy dough. And then, 85% by weight of hydrogenated maltose syrup as carbohydrate and hydrogenated maltose syrup as another carbohydrate were mixed to form a noncrystalline sugar-free candy, which was kept hot at 100° C. to prepare a type of noncrystalline sugar-free candy. As the noncrystalline sugar-free candy was simultaneously deposited with the crystalline candy dough, the noncrystalline sugar-free candy became too viscous to be simultaneously poured into a molding tool.

Comparative Example 6

80% by weight of xylitol as carbohydrate and 20% by weight of sorbitol as another sugar alcohol were mixed and heated up to 140° C. to melt. The carbohydrate solution was stirred and cooled to precipitate xylitol crystal, the solution being kept hot at 66° C. to prepare crystalline candy dough. And then, 85% by weight of hydrogenated maltose syrup and 15% by weight of hydrogenated palatinose were mixed as carbohydrate to form a noncrystalline sugar-free candy, which was kept hot at 160° C. to prepare a type of noncrystalline sugar-free candy. As the noncrystalline sugar-free candy was simultaneously deposited with the crystalline candy dough, the crystalline candy melted, failing to produce a candy the junction part of which being continuous and smooth.

Comparative Example 7

80% by weight of xylitol as carbohydrate and 20% by weight of maltitol as another sugar alcohol were mixed and heated up to 140° C. to melt. The carbohydrate solution was stirred and cooled to precipitate xylitol crystal, the solution being kept hot at 60° C. to prepare crystalline candy dough. And then, 85% by weight of hydrogenated maltose syrup and 15% by weight of hydrogenated palatinose were mixed as carbohydrate to form a noncrystalline sugar-free candy, which was kept hot at 100° C. to prepare a type of noncrystalline sugar-free candy. As the noncrystalline sugar-free candy was simultaneously deposited with the crystalline candy dough, the noncrystalline sugar-free candy became too viscous to be simultaneously poured into a molding tool.

Comparative Example 8

66% by weight of xylitol as carbohydrate and 34% by weight of hydrogenated maltose syrup as another sugar alcohol were mixed and heated up to 140° C. to melt. The carbohydrate solution was stirred and cooled to precipitate xylitol crystal, the solution being kept hot at 60° C. to prepare crystalline candy dough. And then, 85% by weight of hydrogenated maltose syrup and 15% by weight of hydrogenated palatinose were mixed as carbohydrate to form a noncrystalline sugar-free candy, which was kept hot at 160° C. to prepare a type of noncrystalline sugar-free candy. As the noncrystalline sugar-free candy was simultaneously deposited with the crystalline candy dough, the crystalline candy melted, failing to produce a candy the junction part of which being continuous and smooth.

The invention claimed is:

1. A process for producing a candy, comprising:
simultaneously depositing a flowable crystalline candy dough at a temperature of 70 to 90° C. and a flowable noncrystalline sugar-free candy dough at a temperature of 115 to 130° C., said flowable crystalline candy dough and said flowable noncrystalline sugar-free candy dough being combined side-by-side,
wherein 98 to 99% by weight of said flowable crystalline candy dough is xylitol and 2 to 1% by weight of said flowable crystalline candy dough is another sugar alcohol selected from the group consisting of erythritol, maltitol, hydrogenated maltose syrup and combinations thereof.

2. The process for producing a candy as claimed in claim 1, wherein said crystalline candy dough and said noncrystalline sugar-free candy dough are simultaneously deposited and then are cooled.

3. A process for producing a candy, comprising:
heating a compound containing 98 to 99% by weight of xylitol and 2 to 1% by weight of another sugar alcohol, said compound being heated to a temperature sufficient to melt said compound and form a solution;
forming a flowable crystalline candy dough by cooling said solution to a temperature sufficient to maintain flowability and to crystallize part or most of said xylitol and said another sugar alcohol;
simultaneously depositing (i) said flowable crystalline candy dough and (ii) a flowable noncrystalline sugar-free candy dough, said flowable crystalline candy dough being at a temperature of 70 to 90° C. and said flowable noncrystalline sugar-free candy dough being at a temperature of 115 to 130° C. when said crystalline candy dough and said noncrystalline sugar-free candy dough during said simultaneously depositing; and
cooling after simultaneously depositing.

4. The process for producing a candy as claimed in claim 3, wherein said another sugar alcohol consists of one or more of sugar alcohols selected from erythritol, sorbitol, maltitol and hydrogenated maltose syrup.

* * * * *

UNITED STATES PATENT AND TRADEMARK OFFICE
CERTIFICATE OF CORRECTION

PATENT NO.       : 8,568,816 B2
APPLICATION NO.  : 11/919238
DATED            : October 29, 2013
INVENTOR(S)      : Kojima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this
Fifteenth Day of September, 2015

Michelle K. Lee
*Director of the United States Patent and Trademark Office*